April 15, 1952  V. P. WARREN, II  2,593,370
COMBINATION DAIRY, VEGETABLE, AND STORAGE REFRIGERATOR
Filed June 8, 1948  2 SHEETS—SHEET 2
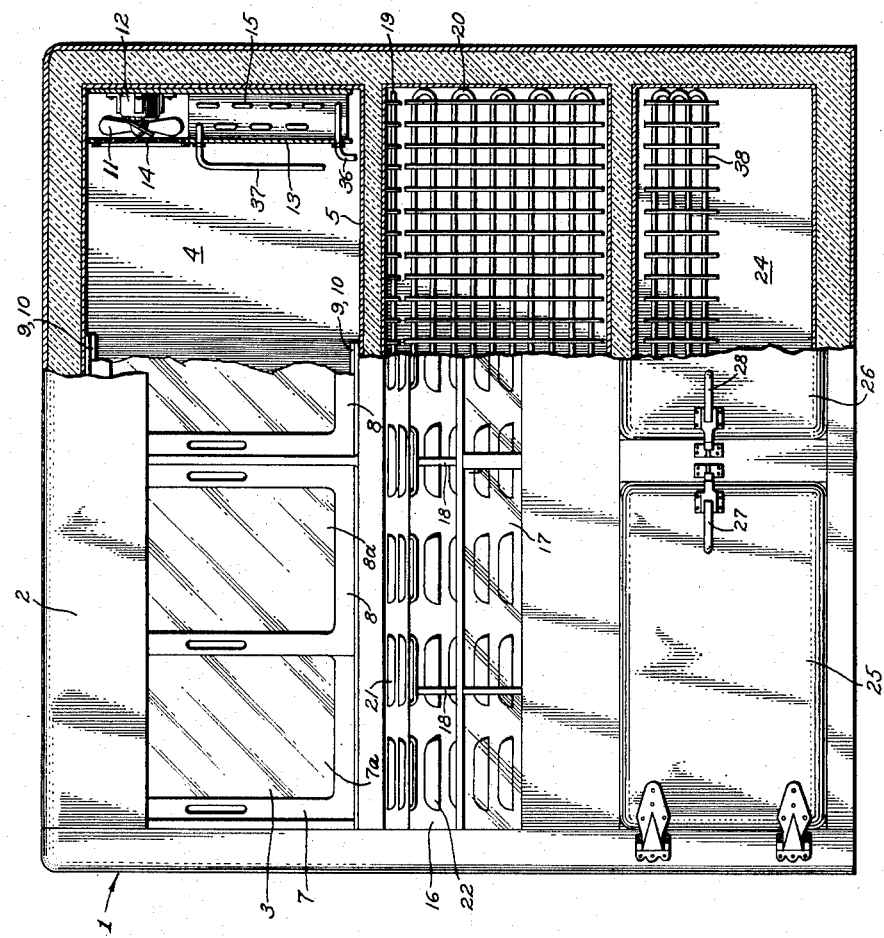
Inventor
VIRGIL P. WARREN II
By Mason, Fenwick & Lawrence
ATTORNEYS Patented Apr. 15, 1952

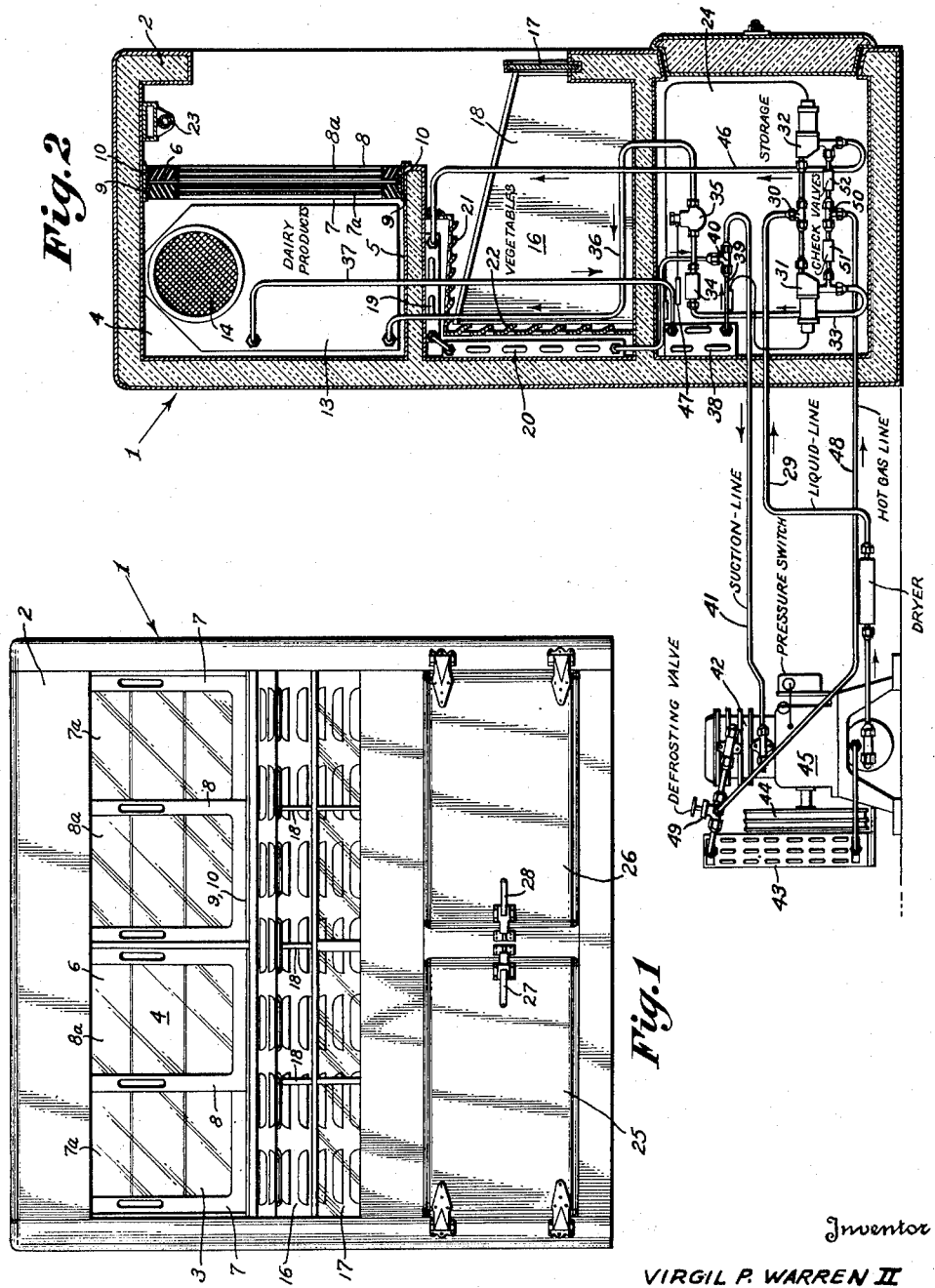

2,593,370

UNITED STATES PATENT OFFICE 2,593,370

COMBINATION DAIRY, VEGETABLE, AND STORAGE REFRIGERATOR

Virgil P. Warren, II, Atlanta, Ga.

Application June 8, 1948, Serial No. 31,644

8 Claims. (Cl. 62—89.5)

This invention relates to a multi-compartment refrigerator, more specifically to a refrigerator having a dairy compartment, a vegetable tray or bin and a storage compartment.

In common practice, separate refrigerators are used for vegetables and dairy products; and, while in some instances two separate compartments have been embodied in a single refrigerator casing for refrigerating different types of foods at different temperatures, these have not been arranged in a manner to make the respective compartments readily accessible and to serve for display purposes.

An object of the present invention, therefore, is to provide in a single refrigerator casing or chassis, three separate compartments, one for storing dairy products, one for storing vegetables, and the third or storage compartment for storing either or both of these, all of which compartments are readily accessible to the user, and the first two of which will display the foods contained therein.

A more specific object of the present invention is to provide a combination vegetable, dairy products and storage refrigerator having an upper dairy products cabinet, a central open type vegetable tray or bin, and a lowermost storage compartment for storing dairy products, or vegetables, or both, the refrigerator embodying a system involving two branch refrigerant feed lines, one which supplies the dairy compartment and vegetable bin, and the other which supplies the storage compartment so as to provide different temperatures in the respective compartments suitable for the types of foods contained therein.

A further specific object of the invention is to provide in a multi-compartment refrigerator having a permanently open front wall, an upper display dairy compartment which is inset with respect to the front wall and an open type bin below the dairy compartment suitable for storing vegetables or other foods and extending below the front opening so that a person may lean into the opening and help himself to such vegetables or other foods stored in the open type lower bin.

Other objects and advantages will become more apparent from a study of the following specification, taken with the accompanying drawing wherein:

Figure 1 is a front view of a refrigerator including dairy, vegetable and storage compartments in accordance with the principles of the present invention;

Figure 2 is a side cross-sectional view of the refrigerator cabinet shown in Figure 1, and showing the refrigeration system employed for cooling the interior of the respective cabinets; and, Figure 3 is a somewhat enlarged front view, similar to Figure 1, shown partly cut away and more clearly showing the internal refrigerating coils.

Referring more particularly to the drawings, numeral 1 denotes, generally, a refrigerator casing or chassis lined with any suitable heat insulating material. The refrigerator has a depending hood 2 at the top front portion thereof below which there is provided a permanent opening 3 extending throughout the entire width. No door is provided for such opening 3 and the opening is made high enough to allow persons to lean in and help themselves to products which are stored in the center compartment which will be described hereinafter.

At the top of the refrigerator, a dairy products compartment or cabinet 4 is inset with respect to the front opening 3 and hood 2, and comprises a lower shelf 5 and a vertical wall 6 comprising horizontally sliding doors such as 7 and 8. These doors may be made of hard rubber or any other suitable material and are preferably provided with glass panes, such as 7a and 8a, respectively, so that the dairy compartment can function as a display compartment or cabinet. The doors may be slidable on hard rubber tracks such as 9 and 10. A blower fan 11 driven by motor 12 is encased in a casing or housing 13 located within the dairy products compartment. Grille work 14 is provided in casing 13 adjacent to the fan, also the lower part of the casing 13 is open, to permit circulation of air through the finned refrigerating coils 15 which are enclosed within the casing to form a blower evaporator to refrigerate the dairy compartment.

Below the dairy compartment 4 there is provided a vegetable bin or compartment 16 preferably having a front vertical glass panel 17 and a plurality of vertically disposed divider or partition walls 18 for separating different types of vegetables, forming separate bins. Compartment 16, therefore, constitutes a vegetable display compartment of the open type. The vegetable compartment is refrigerated by means of upper horizontally disposed finned coils 19 at the roof of the compartment 16 and vertically disposed finned coils 20 at the rear of the compartment, which coils are concealed by a series of louvres 21 and 22, respectively, to permit free circulation of air between the space in the vicinity of the coils and that in the vegetable compartment. The coils may be of any suitable structure such as of sinuous configuration having fins disposed in the manner as shown more clearly in Figure 3, the coils forming a gravity type evaporator. The vegetable compartment may be illuminated by a light 23 such as a fluorescent light located just behind the hood 2, which light, of course, will also illuminate the dairy products compartment.

At the bottom of the refrigerator casing or chassis, there is provided a storage cabinet or compartment 24, which is closed by means of front hinged doors 25 and 26 provided with suitable handles 27 and 28, respectively. The doors 25 and 26 may be provided with glass panes (not shown) in the event the lower storage compartment is to serve as a display compartment as well. The lower compartment is refrigerated by means of the gravity type evaporator coil 38.

The refrigeration system is shown in Figure 2 and operates in the following manner:

Refrigerating liquid of any suitable type, such as methyl chloride, is fed into the system by means of the liquid pipe line 29 and converges at a T 30 whereupon it divides, part of it flowing to an expansion valve 31 and the other part, to an expansion valve 32 of any suitable and well-known type. These expansion valves may be made of the same capacity if so desired. Liquid refrigerant from expansion valve 31 feeds through line or pipe 33 to a line strainer 34, which strainer is for the purpose of preventing any dirt particles or oil bubbles from entering the snap-action valve 35 into which the liquid refrigerant subsequently flows. From valve 35, the refrigerant flows through line 36 to the lower part of coils 15 in the dairy products compartment, thereafter flowing through the length of the coil, thence down through line 37 into the upper part of coil 38 in the storage compartment, thence through the coil 38 and finally emerging from line 39, T 40 and suction line 41. Suction line 41 is connected to a compressor 42 and condenser 43 which is cooled by a fan 44 driven by an electric motor 45.

The snap action valve 35 is for the purpose of controlling the temperature of the upper dairy compartment and the lower storage compartment through an air bulb 47 located in the lower storage compartment. This valve preferably has a temperature range of from 20° F. to 50° F. with a set differential of 4° F. The function of this valve is to shut off the flow of the liquid refrigerant to the blower evaporator coil 15 and the gravity evaporator coil 38 when the proper set temperature is reached in these two compartments. It will be noted that the snap action valve is located in the forward end rather than at the tail end of the evaporator to prevent liquid flooding of the evaporator by the expansion valve 31 when the snap action valve is closed, thereby preventing frost back on suction line 41.

The portion of the liquid refrigerant that is fed into expansion valve 32 flows through pipe line 46 to the upper coil 19 in the vegetable compartment, traversing the length of the coil, thence to the top of coil 20 (the coils being connected in series at the corner as shown) and emerging from the bottom of the coil 20 to T 40 thereby joining the liquid refrigerant returning from the dairy and storage compartments and thence flowing out into suction line 41.

Thus, it will be seen that two parallel lines or branches are provided which emerge from the respective expansion valves, one flowing only to the vegetable compartment and the other flowing first to the dairy compartment and then to the storage compartment, all the aforementioned coils being finally connected to a common return or suction line. This enables greater refrigeration of the vegetable bin which is usually necessary in view of its being permanently open at the top. Of course, if the vegetable container were much smaller and particularly if the dairy products and storage cabinets were rather large it might be necessary to decrease the capacity of the expansion valve leading to the vegetable compartment, or to otherwise provide more refrigeration for the dairy and storage compartments.

For defrosting purposes a hot gas defrost line 48 is provided into which hot gases may be fed by opening of the defrosting valve 49. The hot gas line 48 feeds into T 50 and is diverted to separate lines flowing through check valves 51 and 52. The check valves function as follows:

Assuming the expansion valve 32 closes and expansion valve 31 continues to feed its part of the system, the check valves 51 and 52 will prevent the flooding of the evaporator or coils 19 and 20, thereby preventing a possible frost back of refrigerant on suction line 41. This function naturally is performed on the exact opposite operation of the two expansion valves.

Thus, it will be seen that in accordance with the present invention, there is provided a unitary refrigerator in which a single evaporator supplies three separate refrigeration compartments, consisting of an upper dairy display compartment, a middle open-type vegetable display compartment, and a lowermost storage or display compartment suitable for either vegetables, dairy products, or both, which compartments are maintained at separate temperatures. There is provided a unique inset arrangement of the dairy products upper compartment to allow a person to extend his head through the front opening and reach down into the vegetable display bin or compartment to freely help himself to the vegetables or other products which may be stored therein; also there is provided a refrigerating system having two branch lines—one which feeds the dairy products compartment and storage compartment and the other which feeds the vegetable compartment, thereby insuring greater flow of refrigerating liquid in the vegetable compartment which normally requires greater refrigeration since it is permanently open at the top; also there is provided a 3-in-1 refrigerator which enables a storekeeper of a small store to refrigerate dairy products, vegetables and similar products in a single casing, thereby reducing costs and at the same time employing in a single structure displays of dairy products and vegetables in a manner that is not only attractive but readily accessible to the user, whereby in one stop the user may help himself to the various products.

While the center compartment has been described as being a vegetable compartment, it will be apparent that insofar as the upper inset arrangement of the dairy compartment is concerned that it might equally be a frozen food compartment preferably extending clear to the bottom of the refrigerator casing, in which event the storage compartment is preferably eliminated.

While for purposes of illustration only, a single embodiment of the invention is shown in the drawings, it should be noted that this is merely by way of example and that other modifications

I claim:

1. A multi-compartment refrigerator comprising a thermally insulated casing including a vertical front wall having a permanently open front opening in its upper part, in a vertical plane, bounded on all sides by casing structure, a cabinet within the upper portion of said casing inset with respect to said front opening, having its front parallel to said opening, and provided with door closures, a refrigerated open compartment disposed beneath said cabinet and extending forwardly thereof below said front opening thereby permitting a user to lean into said opening and help himself to products contained in said compartment, and means for refrigerating said cabinet and compartment.

2. A refrigerator having a front wall including a hood depending from the top thereof, said front wall having a large opening co-extensive with the width of the refrigerator, a refrigerated cabinet inset with respect to said hood and opening and disposed in the upper portion of said refrigerator, horizontally slidable doors for closing the front of said cabinet, an open type refrigerated bin disposed beneath said cabinet and extending below the lower edge of said front opening so that the user may extend his head into said front opening and help himself to products contained in said bin, and means for refrigerating said cabinet and said bin.

3. A multi-compartment type refrigerator having a front wall provided with an enlarged opening, a hood depending from the top of said front wall, a dairy products cabinet inset with respect to said wall and including a horizontal shelf and a vertical wall with horizontally sliding doors, said vertical wall being in spaced relationship with said refrigerator front wall, a blower fan type evaporator contained within said dairy products cabinet, a vegetable bin disposed centrally of said refrigerator and beneath said dairy products cabinet and including gravity type evaporator extending along the roof and rear walls thereof together with louvres for concealing said coils, said bin including a plurality of vertically disposed partitions and being exposed at the top and accessible through said front opening so that one may lean into said opening and help himself to vegetables contained in said bin, a lowermost storage compartment having doors at the front thereof for closing the compartment and including an evaporator, and refrigerating means including said evaporators in said cabinet, bin and compartment for maintaining separate and refrigerated temperatures therein.

4. Apparatus recited in claim 3 wherein said last named refrigerating means includes a liquid refrigerant supply line and a pair of expansion valves into which different portions of said liquid are diverted, one of said expansion valves feeding said dairy products cabinet and storage compartment evaporators and the other of said expansion valves feeding said evaporator contained in said vegetable bin.

5. A refrigerator having a front wall provided with an enlarged opening coextensive with the width of the refrigerator and with a substantial portion of the height thereof, a dairy compartment having doors and being inset with respect to said front wall at the upper portion of the refrigerator, a vegetable compartment having a top which is permanently open and exposed to said opening, a closed storage compartment including doors and disposed beneath said vegetable compartment and means for refrigerating said respective compartments at different temperatures including a liquid refrigerant line, a pair of expansion valves into which portions of the liquid refrigerant are fed, and evaporator coils disposed in each of said compartments, one of said expansion valves feeding the dairy and storage compartments and the other of said expansion valves feeding the vegetable compartment.

6. Apparatus as claimed in claim 5, including a hot gas defrost line connected to said expansion valves and including check valves for preventing the flooding of said evaporator coils.

7. A multi compartment refrigerator comprising a cabinet having front, rear, end, top and bottom walls incorporating thermal insulation, the front wall having an opening extending from an intermediate point in the height of said front wall to a point adjacent the top, and substantially from end to end of the cabinet bounded on all sides by the wall structure of said cabinet, a transverse partition at a level below the bottom of said opening extending from back wall to front wall, defining with the cabinet structure below it a storage chamber, a second transverse partition at a level intersecting the area of said opening intermediately, extending from said back wall but terminating short of the plane of said front wall, an upper compartment of which said second transverse partition forms the bottom, having a front wall inset from the front wall of said cabinet and provided with doors, said transverse partitions defining between them and with the intervening cabinet structure an intermediate open compartment, said upper and intermediate compartments being accessible through the opening in said front wall, and means for refrigerating said compartments.

8. A multi compartment refrigerator as claimed in claim 7, said refrigerating means being so correlated as to provide a different datum temperature for each compartment.

VIRGIL P. WARREN, II.

REFERENCES CITED

The following references are of record in the file of this patent:

UNITED STATES PATENTS

| Number | Name | Date |
| --- | --- | --- |
| 1,204,263 | Fratt | Nov. 7, 1916 |
| 1,541,769 | Platter | June 9, 1925 |
| 1,898,560 | Mezzapesa | Feb. 21, 1933 |
| 1,955,186 | Hill | Apr. 17, 1934 |
| 2,119,422 | Cruse | May 31, 1938 |
| 2,408,460 | Van Doren | Oct. 1, 1946 |
| 2,476,491 | Henderson | July 19, 1949 |
| 2,522,090 | Brill | Sept. 12, 1950 |